United States Patent Office.

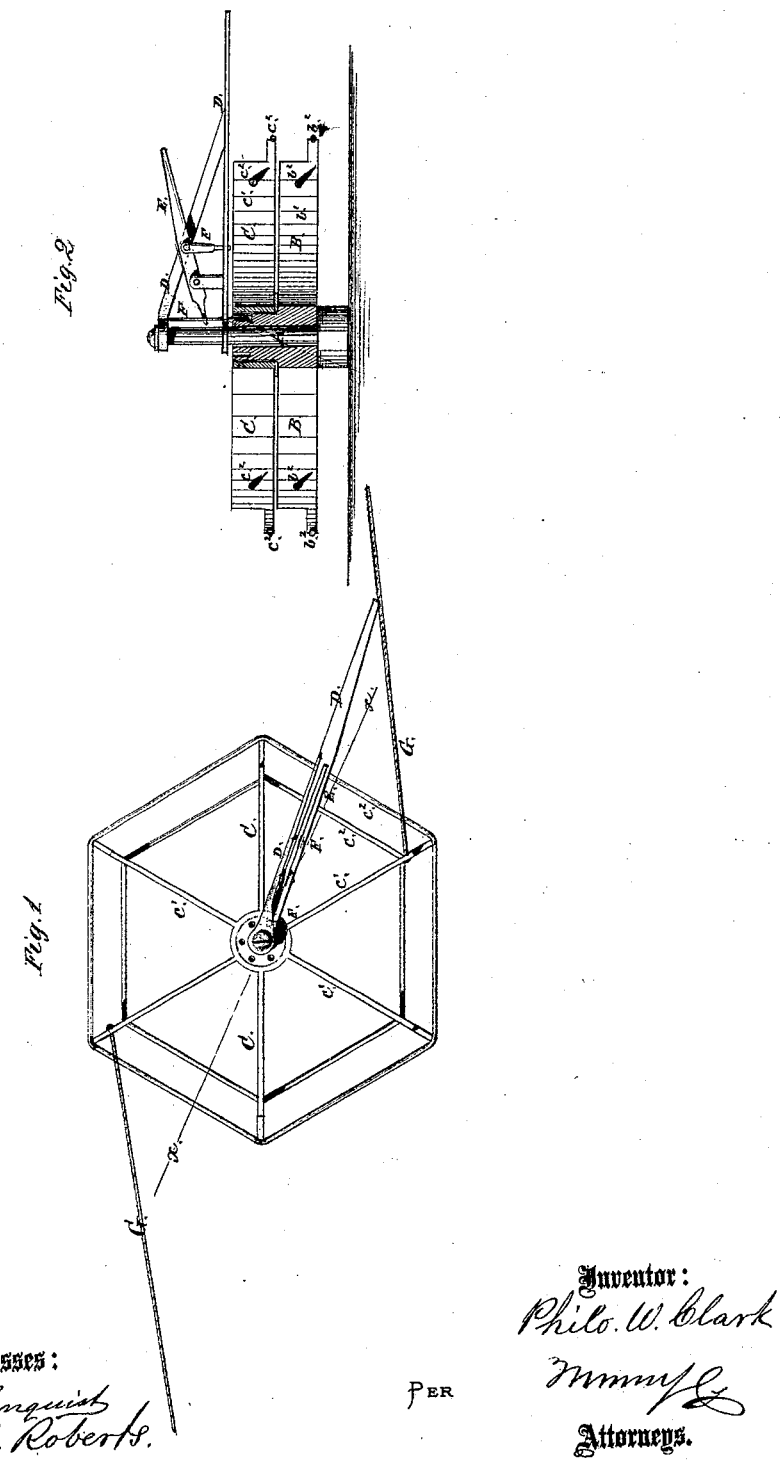

PHILO W. CLARK, OF OBLONG, NEW YORK.

Letters Patent No. 102,491, dated May 3, 1870.

IMPROVEMENT IN HORSE-POWER.

The Schedule referred to in these Letters Patent and making part of the same

*To all whom it may concern:*

Be it known that I, PHILO W. CLARK, of Oblong, in the county of Dutchess and State of New York, have invented a new and useful Improvement in Horse-Power; and I do hereby declare that the following is a full, clear, and exact description thereof, which will enable others skilled in the art to make and use the same, reference being had to the accompanying drawings forming part of this specification, in which—

Figure 1 is a top or plan view of my improved horse-power.

Figure 2 is a detail vertical section of the same, taken through the line $x\,x$, fig. 1.

Similar letters of reference indicate corresponding parts.

My invention has for its object to furnish an improved horse-power, designed more especially for use in cases where it is desired that the direction of the draft may be changed or shifted without stopping or changing the direction of the power; and It consists in the horse-power constructed as hereinafter more fully described.

A is a post or stationary vertical shaft, the lower end of which is securely attached to a block or other suitable support.

B is a wheel which revolves upon the shaft A, and the hub of which projects upward to serve as a journal or sleeve for the upper wheel C to revolve upon, so that the one wheel may revolve in one direction while the other wheel revolves in the other direction, or the one wheel may revolve in either direction while the other wheel may remain stationary.

If desired, the upper part of the hub of the wheel B, upon which the wheel C revolves, may be made large, reducing the upper wheel to little more than a rim. In this case the wheels B C should be provided with friction-rollers to diminish the friction as the two wheels revolve upon each other.

The wheels B and C are made with deep and narrow radial spokes $b^1$ and $c^1$, the outer ends of which are rabbeted from the upper edges, as shown in fig. 2, to form a seat for the draft-ropes to be wound upon.

The projecting lower parts of the spokes $b^1$ $c^1$ are connected by rods $b^2$ and $c^2$, to give strength and support to said spokes, and at the same time prevent the draft-ropes from catching or passing beneath the ends of the said spokes.

D is the sweep, to the outer end of which the power is applied, and the inner end of which revolves upon the shaft A.

To the sweep D is pivoted a lever, E, which is provided with two catch-bolts F, so arranged that one may catch upon the upper wheel C and the other upon the wheel B, alternately, so that the sweep D may be thrown into gear with the one or the other of said wheels, as desired.

If desired, the wheels B C may be placed the one above the other, with a space between them, and the sweep D be attached to or connected with the shaft A in the said space between the said wheels.

In this case only one catch-bolt F will be required, or rather the two catch-bolts F may be made in one piece, which may be made to catch upon one or the other of the wheels B C, as may be required.

If desired the sweep D may be rigidly attached to the shaft A, the lower end of said shaft revolving in a step.

G are the draft-ropes, which are attached to the wheels B C, one to each, as shown in fig. 1, so that the draft may be applied in the one or the other direction at the will of the operator.

This power is especially designed for use with my improved excavating apparatus, but is equally applicable for various other uses where it is desired to change the direction of the draft without changing the direction or checking the motion of the power.

Having thus described my invention,

I claim as new and desire to secure by Letters Patent—

1. The combination of the two wheels B C, each being provided with its own draft-rope G, central shaft A, whether movable or stationary, sweep D, lever E, and one or more catch-bolts F, with each other, substantially as herein shown and described, and for the purpose set forth.

2. Constructing the wheel or wheels of a horse-power of a series of deep and narrow radial spokes, rabbeted upon the upper edge of their outer ends, and connected with rods, substantially as herein shown and described, and for the purpose set forth.

The above specification of my invention signed by me this 8th day of October, 1869.

PHILO W. CLARK.

Witnesses:
  GEO. W. MABEE,
  JAMES T. GRAHAM.